United States Patent [19]

Cellier

[11] 4,174,938

[45] Nov. 20, 1979

[54] REMOTE NUCLEAR GREEN PELLET PROCESSING APPARATUS

[75] Inventor: Francis Cellier, Export, Pa.

[73] Assignee: Westinghouse Electric Corp., Pittsburgh, Pa.

[21] Appl. No.: 828,059

[22] Filed: Aug. 26, 1977

Related U.S. Application Data

[63] Continuation of Ser. No. 765,485, Feb. 4, 1977, abandoned.

[51] Int. Cl.$^2$ .............................................. B29C 1/00
[52] U.S. Cl. ..................................... 425/317; 264/0.5; 425/363; 425/406
[58] Field of Search ................. 176/DIG. 2; 250/517; 252/301.1 R, 301.1 W, 478; 264/0.5; 425/DIG. 201, 317, 363

[56] References Cited

U.S. PATENT DOCUMENTS

| 3,090,740 | 5/1963 | Huston et al. ................. 176/DIG. 2 |
| 3,371,133 | 2/1968 | Nishijima et al. ...................... 264/0.5 |
| 3,883,441 | 5/1975 | Murphy et al. .............. 252/301.1 W |
| 3,940,628 | 2/1976 | Stock et al. .................. 252/301.1 W |

OTHER PUBLICATIONS

Nuclear Power, Mar. 1959, pp. 113 to 114.

Primary Examiner—Leland A. Sebastian
Attorney, Agent, or Firm—L. A. DePal; Z. L. Dermer

[57] ABSTRACT

An automated system for manufacturing nuclear fuel pellets for use in nuclear fuel elements of nuclear power reactors. The system comprises process components arranged vertically but not directly under each other within a single enclosure. The vertical-lateral arrangement provides for gravity flow of the product from one component to the next and for vertical removal of each component without interference with the other components. The single enclosure eliminates time consuming transfer between separate enclosures of each component while providing three-sided access to the component through glove ports.

3 Claims, 4 Drawing Figures

4,174,938

REMOTE NUCLEAR GREEN PELLET PROCESSING APPARATUS

This is a continuation of application Ser. No. 765,485 filed Feb. 4, 1977 now abandoned.

BACKGROUND OF THE INVENTION

This invention relates to systems for manufacturing nuclear fuel green pellets and particularly to such systems wherein the process is automated.

In many designs of nuclear reactors, the reactor vessel has an inlet and outlet for circulation of a coolant in heat transfer relationship with a core contained therein that produces heat. The core comprises an array or arrays of fuel assemblies which contain fuel elements. The fuel element is generally a cylindrical metallic sheath sealed at both ends containing nuclear fuel. The nuclear fuel which may be, for example, ceramic fuel pellets of a uranium compound, is stacked within the metallic sheath. During reactor operation, the nuclear fuel pellets decompose releasing fission products such as fission gas while generating heat in a manner well known in the art.

There are many known methods for manufacturing the nuclear fuel pellets used in nuclear reactors. Most of these methods generally consist of cold pressing a powder which may be an oxide of fissionable material such as uranium dioxide to form dense compacts. These dense compacts are generally referred to as green pellets. The green pellets are then sintered in a non-oxidizing atmosphere to produce a sintered pellet which may have slight irregularities on its surface. The sintered pellet may then be ground to remove those irregularities thereby forming a right cylindrical pellet. This finished pellet is then stacked within the metallic sheath to form the fuel element that may be used in a nuclear reactor.

A commonly known method for producing the nuclear fuel pellets is described in U.S. Pat. No. 2,991,601 to J. Glatter et al, issued July 11, 1961. In this process, hydrogen reduction of uranium trioxide is employed to produce uranium dioxide powder. As received from commercial manufacturers, this uranium dioxide is not free flowing and is, therefore, not adaptable for use in automatic machinery for the production of the green pellets. In order to produce a free flowing powder, the uranium dioxide powder is mixed with a suitable binder such as aluminum stearate and water to form a wet granulate. The wet granulate is then forced through a screen and dried, after which it is dry-screened thereby separating the larger particles from the smaller particles. The water may be substantially removed in the later sintering process while the aluminum stearate will remain and act as a lubricant in the compacting process. Once the uranium dioxide powder has thus been converted into a free flowing granulate, the granulate is then compacted into green pellets in a cold pressing operation. The compacting process comprises flowing the granulate into a die and cold pressing the granulate in the die into substantially cylindrical green pellets. The green pellets may then be heat treated, sintered and ground to form the finished pellet for use in nuclear fuel elements.

While the patent to Glatter and other known methods illustrate commonly understood methods of manufacturing green pellets, these methods all involve relatively small volume production. Because the prior art methods involved small volume production, these processes were performed in a glove box environment. Each process was performed in a separate glove box type enclosure and then moved under secure conditions to the next glove box where the succeeding step was performed. This glove box arrangement not only required long time intervals during bag-out transfer between glove boxes, but it also required a large amount of floor space to accommodate the glove boxes. Furthermore, the glove box enclosure did not provide adequate accessibility to the apparatus therein due to the limited capability of the typical glove box arrangements. With the demand for nuclear fuel increasing it became a commercial necessity to be able to mass produce the green pellets. Such mass production would entail larger apparatus and faster throughput both of which were not compatible with conventional glove box arrangements. In addition, the recent use of plutonium dioxide in a mixed oxide pellet increased the safeguards which must be employed to assure accountability of the plutonium. The necessity of moving the plutonium from one glove box to the next in a large volume process would create serious accountability problems that result in substantial time delays during such transfer between glove boxes. All of these problems together render impractical a large volume production of a mixed oxide green pellet in a typical glove box arrangement.

SUMMARY OF THE INVENTION

An automated system for manufacturing nuclear fuel green pellets for use in nuclear fuel elements of nuclear power reactors. The system comprises process components for manufacturing nuclear fuel green pellets arranged in vertical succession with each component displaced laterally with respect to the other components. The vertical arrangement provides for gravity flow of the products from one component to the next while the lateral placement allows for unobstructed overhead access to each component so that each component may be vertically removed without interference from the other components. The components are contained within a single enclosure that provides access to three sides of each component for maintenance and operation.

It is an object of this invention to provide an automated system for manufacturing nuclear fuel green pellets in which the components are arranged vertically so that the products of the process may flow from one component to the next by the force of gravity.

It is another object of this invention to provide an automated system for manufacturing nuclear fuel green pellets in which the components are arranged to allow unobstructed vertical access to each component.

It is another object of this invention to provide an automated system for manufacturing nuclear green pellets in which the components are arranged within a single enclosure that allows for access to each component from at least three sides.

It is a particular object of this invention to provide an automated system for manufacturing nuclear fuel green pellets in which the components are arranged within a single enclosure to provide unobstructed vertical access to each component, gravity flow between components, and access to each component from at least three sides.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

In the commonly known processes used to manufacture nuclear fuel pellets, the individual subprocesses are performed in separate glove box enclosures. Upon completion of each subprocess, the material is carefully moved to the next glove box enclosure. The invention described herein provides method and apparatus for manufacturing nuclear fuel green pellets in an automated fashion capable of large volume production.

Figure 1:
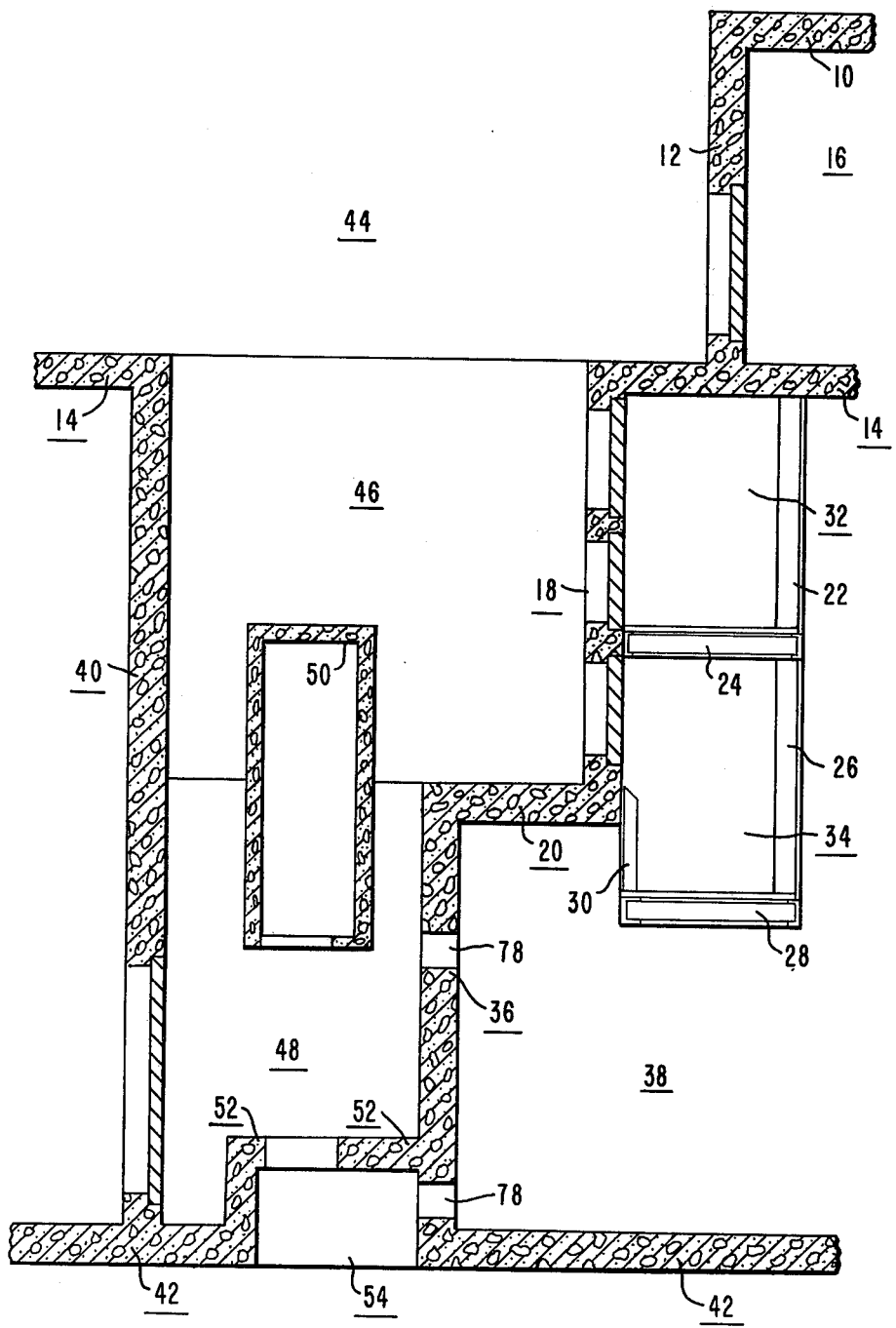
FIG. 1 is a partial cross-sectional view in elevation of the enclosure.
Figure 2:
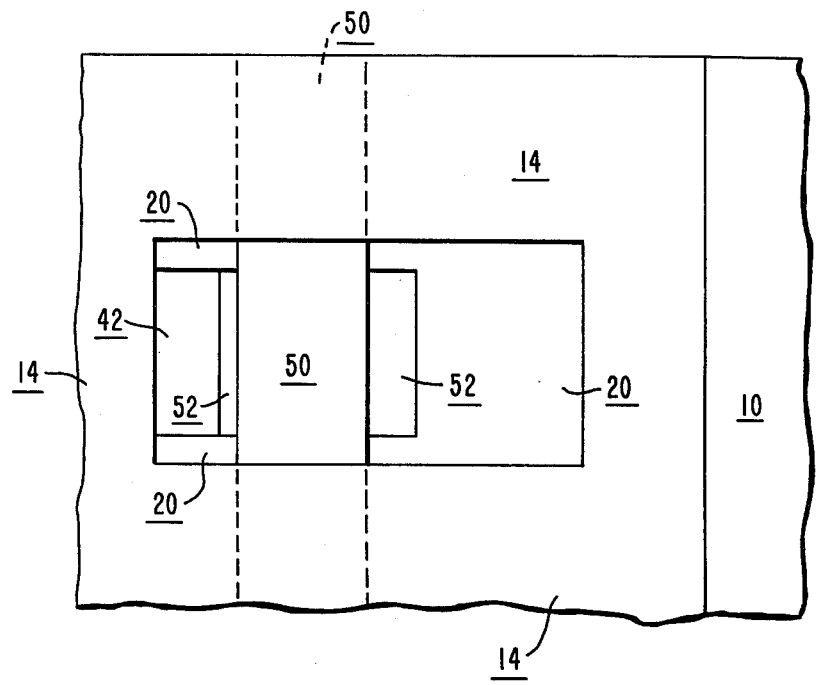
FIG. 2 is a plan view of FIG. 1.

Referring to FIG. 1, a horizontal first floor 10 is supported by a vertical first wall 12. First wall 12 is supported from second floor 14 with first floor 10, first wall 12, and a portion of second floor 14 defining a first chamber 16. A second wall 18 extends from second floor 14 down to third floor 20. A first partition 22, second partition 24, third partition 26, fourth partition 28, and fifth partition 30 together with second wall 18 and second floor 14 define second chamber 32 and third chamber 34. A third wall 36 extends downwardly from third floor 20 and encloses fourth chamber 38. A fourth wall 40 that is parallel to second wall 18 and third wall 36 extends from second floor 14 to fourth floor 42. The entire structure defined above is contained within a single building the inner walls of which along with first wall 12 and second floor 14 define a first area 44. A second area 46 is defined below first area 44 by second wall 18, third floor 20, and fourth wall 40. In addition, a third area 48 is defined below second area 46 by fourth wall 40 and third wall 36. A tunnel 50 which is used for maintenance access is supported through second area 46 and third area 48 while a sixth partition 52 defines a fifth chamber 54 thereunder.

Figure 4:
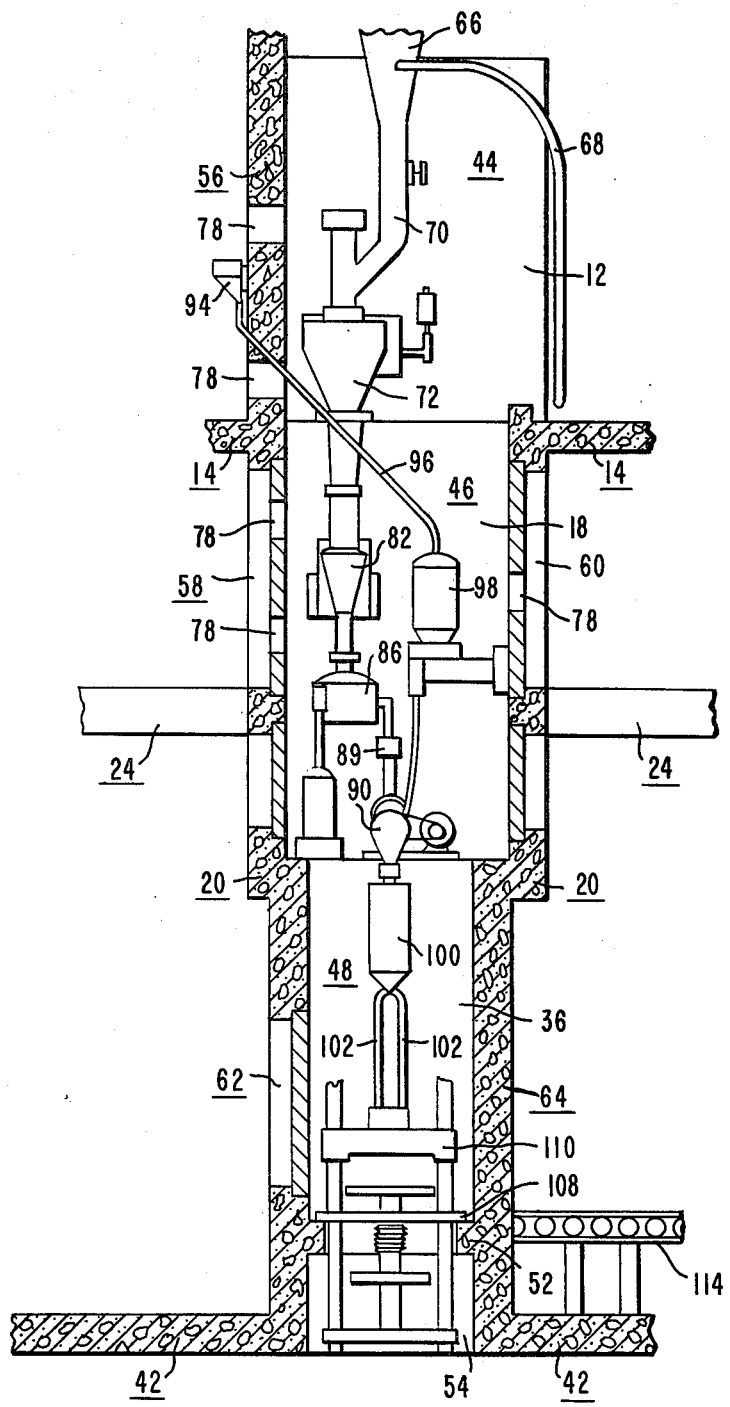
FIG. 4 is a view along line IV—IV of FIG. 3.

Referring now to FIG. 4, first area 44 is further defined by a fifth wall 56 which is perpendicular to first wall 12. Similarly, second area 46 is bounded on two sides by sixth wall 58 and seventh wall 60 which are perpendicular to second wall 18. Likewise, eighth wall 62 and ninth wall 64 further define third area 48. First area 44, second area 46, and third area 48 together with their surrounding structure establish areas such that fuel processing equipment may be vertically arranged therein. The vertical arrangement allows for gravity flow of the material from one subprocess to another. This arrangement also allows for vertical access to the equipment along with side access from behind radiation protective walls.

Figure 3:
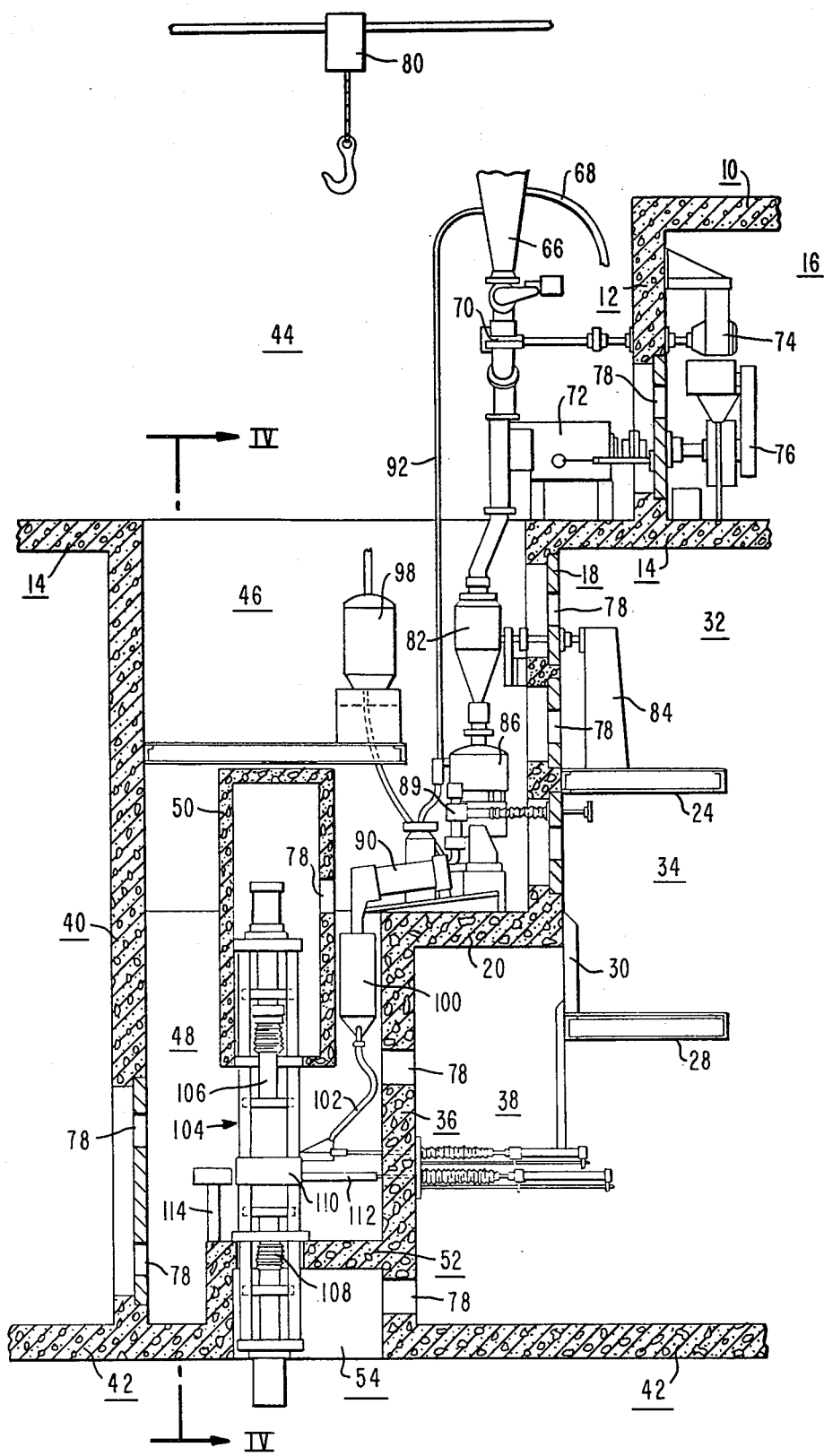
FIG. 3 is a partial cross-sectional view in elevation of the enclosure including apparatus.

Referring now to FIGS. 3 and 4, a compactor feed hopper 66 is disposed in first area 44 near first wall 12. A selected mixture of plutonium dioxide ($PuO_2$) and uranium dioxide ($UO_2$) known as mixed oxide fuel powder is introduced into compactor feed hopper 66 through pneumatic line 68. Compactor feed hopper 66 which is used to store the mixed oxide powder has level sensors (not shown) that indicate the level of the mixed oxide powder in the hopper. A star feeder 70 is connected between compactor feed hopper 66 and roll compactor 72 so as to control the flow rate of mixed oxide powder from compactor feed hopper 66 to roll compactor 72. Roll compactor 72 is located on second floor 14 at an elevation lower than star feeder 70 which allows the mixed oxide powder to flow into roll compactor 72 under the influence of gravity. Star feeder 70 has a first drive mechanism 74 and roll compactor 72 has a second drive mechanism 76 that are both located in first chamber 16 behind first wall 12. The driving arm of both drive mechanisms extend through sealing mechanisms in first wall 12 to their respective machinery. Because the mixed oxide powder in the apparatus such as compactor feed hopper 66 and roll compactor 72 may produce radiation levels that are unacceptable for a longterm working environment, first wall 12 is constructed by common methods so as to limit such radiation in first chamber 16. First wall 12, therefore, allows working personnel to operate and repair the apparatus in first chamber 16 such as drive mechanisms 74 and 76 without exposing such personnel to excessive radiation. In addition, the location of such equipment behind a shielding wall decreases repair time because such equipment is not contaminated. In addition, glove holes are provided at various locations along the walls so that access may be had to the equipment in the enclosures. For example, glove holes are provided at locations referred to generally by 78. It should be noted that the equipment is placed near the walls such as 12 and 56 so that access may be had to the equipment when necessary. As shown in FIG. 4, a person standing on second floor 14 could reach through glove holes 78 to reach star feeder 70 or roll compactor 72. Should this apparatus malfunction, minor repairs could be made in this manner or the non-functioning equipment could be disconnected by hand and then removed by mechanical apparatus such as a crane 80.

Roll compactor 72 comprises two opposing drums that rolls the powder into ribbon-like strips of various lengths. These ribbon-like strips fall by gravity into a granulator 82 that granulates the strips into fine particles. Granulator 82 is disposed in second area 46 and below roll compactor 72 so that gravity may be employed to move the ribbon-like strips. However, granulator 82 is not located directly under roll compactor 72, rather it is located laterally from roll compactor 72 as shown in FIG. 3. Granulator 82 is not located directly below roll compactor 72 so that should it need to be replaced it could be disconnected by hand through glove holes 78 and then be lifted upwardly onto first floor 10 without having to remove roll compactor 72. This arrangement provides for an automated gravity flow without having the various components interfere with each other during insertion or removal of a particular component. As with roll compactor 72, granulator 82 has a granulator drive mechanism 84 located in second chamber 32 behind second wall 18.

A classifier 86 is located below granulator 82 in second area 46. Classifier 86 consists of three chambers arranged vertically within a single housing with two vibrating screens separating the three chambers. Granules from granulator 82 flow by gravity into the first chamber and onto the first screen of classifier 86. Oversized granules are caught on the first vibrating screen and carried off by the vibrating action into a scrap transfer can 88. The remaining granules fall through the first screen onto the second vibrating screen. The proper size granules are carried by the second vibrating screen to a bulk density check station 89 that monitors the density of the granules. Granules having the proper density are permitted to flow to rolling drum 90. The smaller granules fall through both the first and second screens into the bottom of the classifer 86 from where they are pneumatically transferred through recycle line 92 back into compactor feed hopper 66.

Rolling drum 90 is located on third floor 20 and disposed laterally from classifier 86 so that the proper size granules may flow from the second vibrating screen to rolling drum 90 under the influence of gravity while being able to be lifted vertically by crane 80 without interfering with the other components. As is well understood in the art, the granules that are formed as previously described do not readily compact. In order to promote compaction of the granules into pellets a lubricant is added. A typical lubricant so used is aluminum stearate. A stearate feed hopper 94 is disposed on fifth wall 56 with a stearate line 96 attached to the underside thereof. Stearate line 96 is also attached to the top portion of stearate feeder 98 so that the stearate may flow from stearate feed hopper 94 through stearate line 96 into stearate feeder 98 under the force of gravity. Stearate feeder 98 serves to accumulate stearate therein to insure a constant flow to rolling drum 90. Rolling drum 90 is a drum which mechanically rotates about its longitudinal axis to thereby mix the granules with the stearate. As with the other components in the system, the stearate feeder 98 is intended to be located near the enclosing walls such as seventh wall 60 so that maintenance and operational access may be had through glove holes 78. Furthermore, stearate feeder 98 is located so that gravity flow may be utilized while crane 80 may be employed to manipulate the component.

From rolling drum 90, the mixture of stearate and granules flows by gravity into pellet press feed hopper 100. Pellet press feed hopper 100 is disposed below rolling drum 90 to facilitate gravity flow but not directly thereunder so as to facilitate removal by crane 80. From pellet press feed hopper 100, the mixture flows through dual powder lines 102 into pellet press 104. Pellet press 104 consists of an upper punch 106, lower punch 108, and die 110 as is commonly known in the art. Pellet press 104 is disposed in third area 48 so that gravity may be utilized to flow the mixture from pellet press feed hopper 100 to pellet press 104.

Upper punch 106 is mounted in tunnel 50 and extends downwardly through a sealing mechanism into third area 48. Similarly, lower punch 108 is mounted in sixth chamber 54 and extends upwardly into opposition with upper punch 106. The arrangement of upper punch 106 in tunnel 50 and lower punch 108 in sixth chamber 54 provides for an automated operation while allowing access to the machinery from an enclosure to avoid exposure to radiation. For example, repairs may be made to upper punch 106 from within tunnel 50 without exposing the personnnel to radiation. Furthermore, since tunnel 50 extends through second area 46 and third area 48, personnel in tunnel 50 may access other equipment through glove holes 78.

When one of the dual powder lines 102 is alternately placed over die 110, a predetermined amount of the mixture in pellet press feed hopper 100 is allowed to flow into die 110. Upper punch 106 and lower punch 108 are then advanced into opposite ends of die 110 which compresses the mixture into nuclear fuel pellets conforming to the shape of die 110. Such pellets are referred to as green pellets. The punches are then withdrawn and pellet loader 112 or dual powder lines 102 pushes the green pellet onto conveyor 114 which moves the green pellet to the next operation which may be a sintering operation.

As can be seen from the foregoing description, first area 44, second area 46 and third area 48 define a restricted access area that is exposed to radiation and other contaminants. Because of the nature of the radiation and contamination due primarily to plutonium in the restricted access area, it is recommended that personnel not be present therein for extended lengths of time. It is, therefore, recommended that the working personnel remain behind radiation protection such as first wall 12, second wall 18, third wall 36, and fourth wall 40. The areas behind such protective walls including but not limited to first chamber 16, second chamber 32 and third chamber 34 define a limited access area wherein working personnel may be present for controlled periods of time. As described above, parts of the equipment extend through the protective walls into the limited access area so that personnel may have access to them without being unnecessarily exposed to radiation. The gloves holes 78 provide access from the limited access area to the restricted access area while a higher pressure is maintained in the limited access area so that the flow of air and particles will be into the restricted access area thereby preventing outward flow. The equipment in the restricted access area is, therefore, arranged close to at least one of three protective walls so as to increase this access. In addition, to this three-sided accessibility the equipment is arranged vertically but not directly under each other so that removal and replacement of the equipment may be facilitated by means such as crane 80 without interfering with the remaining equipment. Moreover, the vertical arrangement provides for gravity flow of the products while minimizing the required floor space. The gravity flow feature is particularly important because it provides for rapid product throughput with minimal holdup periods and allows for efficient material clean-out, more commonly known as run-out. Efficient material run-out assures that no material remains in the components after each batch is completed. The importance of this lies in the fact that strict accountability of the plutonium is necessitated by governmental and industry standards and that a previous batch will not contaminate a subsequent batch with a different material composition. The invention, therefore, provides an automated system for manufacturing nuclear fuel green pellets within a single enclosure to provide unobstructed vertical access to each component, gravity flow between components, and access to each component from at least three sides.

While there is described what is now considered to be the preferred embodiment of the invention, it is, of course, understood that various other modifications and variations will occur to those skilled in the art. The claims, therefore are intended to include all such modifications and variations which fall within the true spirit and scope of the present invention.

I claim as my invention:

1. Apparatus for manufacturing nuclear fuel pellets comprising:
   a restricted access area defined by a plurality of radiation protective vertical walls and horizontal floors offset from each other which contain components for manufacturing nuclear fuel pellets;
   a limited access area defined by said protective walls and floors and separated from said restricted access area by said protective walls and floors for containing working personnel for operating and maintaining said components, said components comprising;
a compactor feed hopper disposed in said restricted access area and attached to one of said walls for collecting the nuclear fuel material to be made into nuclear fuel pellets, a star feeder valve disposed in said restricted access area below and laterally to said compactor feed hopper and connected to said compactor feed hopper for controlling the flow from said compactor feed hopper, a roll compactor connected to said star feeder valve and disposed in said restricted access area for rolling said fuel material into ribbon-like strips of various lengths, a granulator connected to said roll compactor and disposed in said restricted access area below and laterally to said roll compactor for granulating said ribbon-like strips into granules, a classifier connected to said granulator and disposed in said restricted access area below and laterally to said granulator for separating said granules according to size and allowing properly sized granules to remain in the process stream, a bulk density check station connected to said classifier and disposed in said restricted access area below and laterally to said classifier for checking the density of said granules, a stearate feed hopper disposed in said restricted access area for collecting stearate material, a rolling drum connected to said stearate feed hopper and said bulk density check station and disposed in said restricted access area below and laterally to said bulk density check station and said stearate feed hopper for mixing said granules with said stearate, a pellet press feed hopper connected to said rolling drum and disposed in said restricted access area below and laterally to said rolling drum for collecting said mixture of said granules and said stearate, and a pellet press connected to said pellet press feed hopper and disposed below and laterally to said rolling drum for forming said mixture into nuclear fuel pellets, said components being disposed below and laterally relative to the preceding component thereby allowing said nuclear material to flow between said components under the influence of gravity and allowing said components to be vertically manipulated without interfering with the other components.

2. The apparatus according to claim 1 wherein said components are disposed in close proximity to said protective vertical walls and wherein said protective vertical walls have glove holes therein for providing access to said components from said limited access area.

3. Apparatus for manufacturing nuclear fuel pellets including a restricted access area defined by a plurality of radiation protective vertical walls and horizontal floors offset from each other which contain components for manufacturing nuclear fuel pellets, said components being disposed below and laterally relative to the preceding component thereby allowing nuclear fuel material to flow between said components under the influence of gravity and allowing said components to be vertically manipulated without interfering with the other components, a limited access area defined by said protective walls and floors and separated from said restricted access area by said protective walls and floors for containing working personnel for operating and maintaining said components, said components being disposed in close proximity to said protective vertical walls and wherein said protective vertical walls have glove holes therein for providing access to said components from said limited access area, said components comprising:
  a compactor feed hopper disposed in said restricted access area and attached to one of said vertical walls for collecting the nuclear fuel material to be made into nuclear fuel pellets;
  granulating means disposed in said restricted access area below and laterally to said compactor feed hopper for granulating said nuclear fuel material; and
  a pellet press connected to said granulating means and disposed below and laterally to said granulating means for forming the granulated nuclear fuel material into nuclear fuel pellets.

* * * * *